May 7, 1957     C. L. JOHNSON     2,791,385
LANDING DRAG FLAP AND LIFT SPOILER
Filed March 10, 1952     2 Sheets-Sheet 1
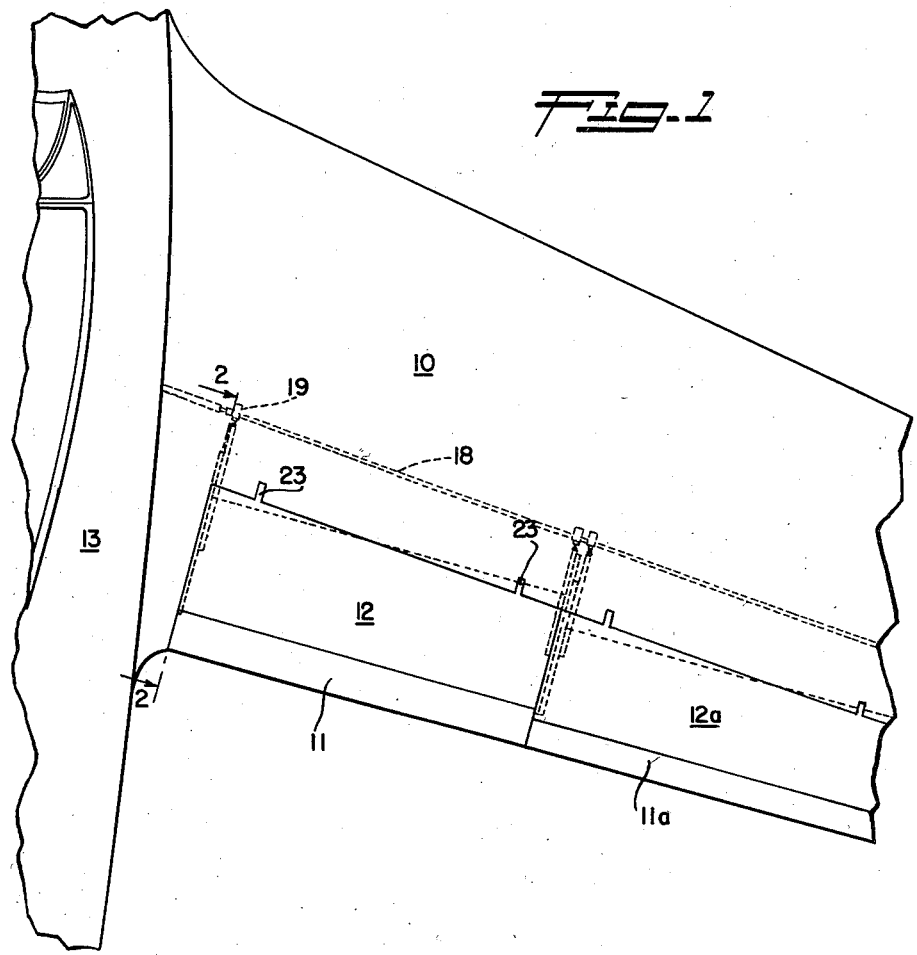
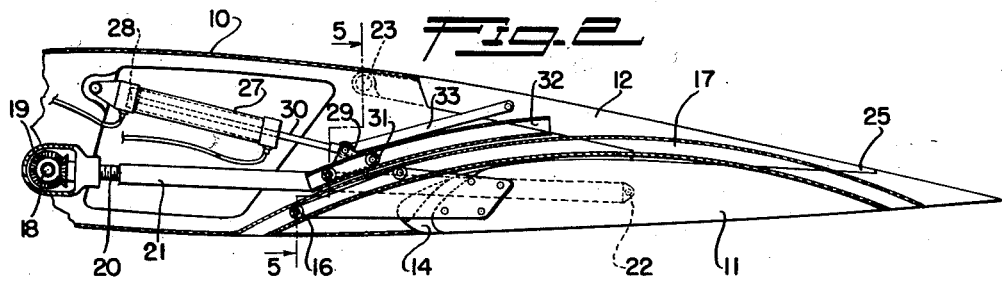
INVENTOR.
CLARENCE L. JOHNSON
BY
Agent May 7, 1957
C. L. JOHNSON
2,791,385
LANDING DRAG FLAP AND LIFT SPOILER
Filed March 10, 1952
2 Sheets-Sheet 2
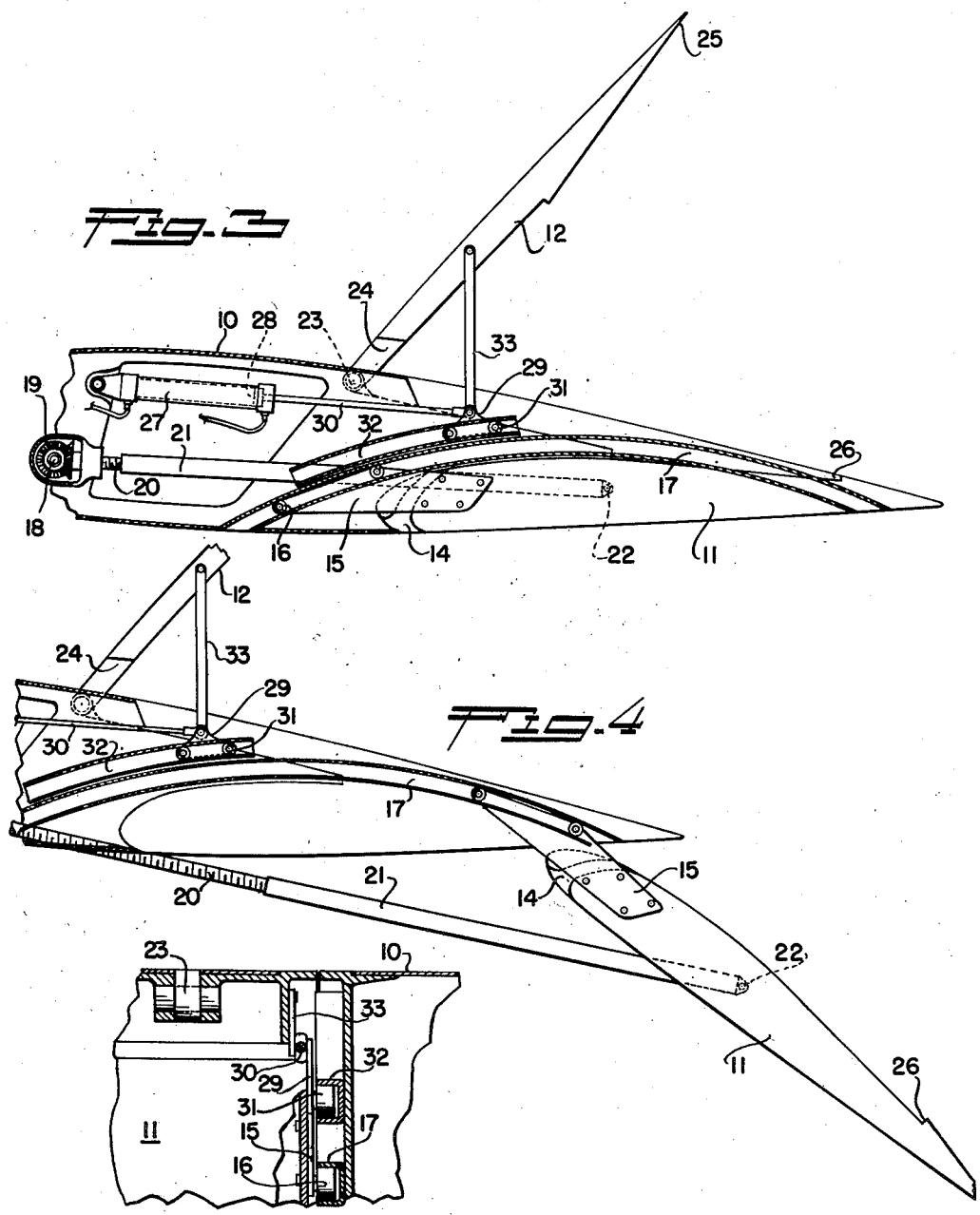
INVENTOR.
CLARENCE L. JOHNSON
BY
Agent

United States Patent Office 2,791,385
Patented May 7, 1957

2,791,385

LANDING DRAG FLAP AND LIFT SPOILER

Clarence L. Johnson, Encino, Calif., assignor to Lockheed Aircraft Corporation, Burbank, Calif.

Application March 10, 1952, Serial No. 275,754

4 Claims. (Cl. 244—42)

This invention relates to control of the landing run of airplanes by increasing the drag, and reducing the wing lift thus increasing the weight transferred to the landing gears to increase the effectiveness of the wheel brakes.

At the moment an airplane first touches down on the runway, it is still largely airborne by the lift of the wings, so that brakes on the landing wheels do not become fully effective until the airplane has slowed down and thus caused the wings to lose a large part of their aerodynamic lift, such lost lift being transformed into weight on the landing gears. In propeller type airplanes the propeller thrust can be reversed to add to the drag of the airplane; and landing flaps have heretofore been used to also increase the drag. Modern high speed airplanes of the jet propulsion type are so aerodynamically clean as to have abnormally long landing runs, further increased because their landing or touch down speeds are higher in proportion to their top speeds; and at such high touch down speeds the landing flaps heretofore useful, become liabilities because of their tendency at high speed to move the center of lift backwardly along the wing chord to produce a nosing over tendency.

It is, accordingly, an important object of this invention to provide in combination with a landing flap a landing spoiler flap tending to destroy, or substantially nullify the lift of the upper surface of the wing, to balance out the increased lift and nosing over tendency of the landing flap. Thus the combination of landing spoiler greatly increases the drag or aerodynamic braking of the airplane, and at the same time substantially reduces the wing lift with a resulting increase of wheel brake effectiveness during the high speed portion of the landing run. The cumulative effect of increased drag and decreased lift results in a substantial reduction of the landing run and a corresponding reduction of the length of runways required to accommodate such high performance airplanes.

It is a further object of this invention to provide a landing spoiler comprising a panel hinged at its forward edge to normally lie flush with the surface of the trailing edge portion of an airplane wing, the panel being of such extent as to substantially nullify aerodynamic lift over the top surface of the wing when extended at an angle to the surface of the wing. The panel, when so extended, creates a turbulent wake to the rear thereof which results in creation of such substantial drag and loss of lift as to prevent the use thereof in flight, hence extension thereof is limited to at or about the instant of ground contact, as the extension thereof while airborne would result in stalling of the airplane.

It is another object of this invention to provide a landing spoiler of the type described having a slot adjacent its hinge line whereby to prevent or reduce the tendency of its turbulent wake to set up flutter in the tail surfaces of the airplane.

Other and further objects and advantages will become apparent as the detailed description of a specific embodiment of my invention proceeds.

In the drawings:

Figure 1 is a fragmentary top plan view of a portion of an airplane fuselage and wing embodying one form of the landing flaps and spoilers of this invention;

Figure 2 is an enlarged section on the line 2—2 of Figure 1 showing a flap and spoiler in their retracted positions, together with tracks and operating mechanisms for the extension thereof;

Figure 3 is a section similar to Figure 2 showing the spoiler in its fully extended position;

Figure 4 is a section similar to Figures 2 and 3 showing both the landing flap and spoiler in their extended positions; and Figure 5 is a fragmentary section through the flap tracks as taken on the irregular line 5—5 of Figure 2.

While my invention is applicable to other than swept and tapered wings 10, I have chosen to show it in connection with wings of that type, with the flaps arranged in sections of decreasing chord in accordance with their relative positions outboard along the wing, so that the flaps form about a third of the wing chord. As shown in Figure 1, the first pairs of lower surface landing flaps 11 and upper surface spoiler flaps 12 are located adjacent to the airplane fuselage 13, the second pairs of flaps 11a and 12a being adjacent and outboard of the first pairs, and so on. For convenience in what follows an inboard pair of flaps will be described in detail as the other pairs are similar except in chord.

The lower or landing flaps 11 are basically high lift Fowler type extendable flaps with leading edge slots 14; the flaps being supported by carriages 15 having rollers 16 operating in curved tracks 17 at each end rigidly mounted in the wing. The curved tracks need not be true circular arcs, although so shown for simplicity, since such Fowler type flaps serve to increase the wing lift at partial extension, while at full extension the flap angle can be so extreme as to destroy the lift and greatly increase the drag forces due to the flap. The several flaps 11 and 11a of a wing are mechanically operated in unison by a common drive shaft 18 running longitudinally of the wing with bevel gear power takeoffs 19 at each side of each flap section operating screws 20 in tubular nuts 21 pivoted to the flaps at 22. The power takeoff and screw are also pivoted to the drive shaft to accommodate the angular movement of the flaps when extended; and the screw and nut arrangement also serves to take most of the airload on the flap off of the flap carriages 15.

The spoiler flaps 12 and 12a, in their closed position, as shown in Figure 2, have their upper surfaces faired into the upper surface of the wing, with offset hinges 23 which provide a leading edge gap 24 (Fig. 3) when the spoilers are raised. The trailing edges 25 of the flaps 12 and 12a nest into notches 26 in the landing flaps 11 and 11a since it is not practical to form a knife edge and it is desired to have the surfaces of the two flaps faired when retracted. The spoiler flaps are shown as tapered in span because of the wing taper, since the hinges 23 are desirably mounted adjacent the usual rear wing spar (not shown).

The spoiler flaps are intended for use as air brakes during the landing run, and hence, to be effective are so large that they cannot be safely used in flight because of the possibility of inducing a stall. Accordingly, it is desirable to provide for fast operation thereof in approximate coincidence with the moment the airplane wheels touch down on landing, so that I prefer to use hydraulic or pneumatic actuating cylinders 27 although screw and nut combinations similar to that described in connection with the landing flaps could also be used. Pistons 28 in the cylinders 27 are connected to carriages 29 by piston rods 30, the carriages having rollers 31 operating in tracks 32 and being connected to the spoiler flaps by links 33 for elevating the latter. The geometry of the piston rods, carriage tracks and links 33 is such as to greatly increase the mechanical advantages or leverage of the power cylinder 27 as the spoiler flap is pivoted to its extreme open position, as shown in Figure 3, wherein the downward forces created on the spoiler flap by airflow over the wing is at its maximum.

In the normal use of the landing flaps 11 and 11a a partial extension thereof, involving a minimum angular displacement thereof, is used to increase wing lift at take-off. A slightly further rearward extension is referred to as the approach position because used during the approach to a landing. Usually full extension and full deflection of the landing flaps is made just prior to touch down as the resulting high drag component, due to the extreme deflection of the flaps, has a vertical or lifting component of force which has a nosing over effect due to its lever arm when fully extended. This lift effect is undesirable, especially during the start of the landing run, because it delays the transfer of the airplane weight from the wings to the wheels of the landing gear; and the wheel brakes are effective in proportion to the load on the landing gears. The rapid extension of the spoiler flaps 12 at the approximate instant of touch down creates a downward reaction, due to the deflection of the air flow over the wing, which offsets the upward reaction of the fully extending landing flaps 11 and thus leaves the drag reactions of both sets of flaps to act as air brakes supplementing the wheel brakes during the first portion of the landing run when the wheel brakes are least effective. This drag effect is accompanied and supplemented by an actual loss of wing lift which renders the wheel brakes more effective. For the spoiler flaps to be effective in cancelling out the lift components of the landing flaps, the spoiler flaps must be of such relatively massive size as to be unusable for flight control purposes, as their primary purpose is to spoil the wing lift rather than to form flight air brakes or lateral control surfaces.

It will thus be seen that I have invented an improved landing air brake system wherein the lift increasing forces of a lower trailing edge flap are neutralized by upper surface spoiler flaps to complement the drag forces of the landing flaps, thereby both increasing the effectiveness of the landing wheel brakes and adding the air brake effects of both types of flaps. Such an arrangement is especially useful with aerodynamically clean jet power aircraft which normally require excessive runway lengths because of their high landing speeds and clean configuration.

Having described only typical forms of the invention I do not wish to be limited to the specific details herein set forth, but wish to reserve to myself any variations or modifications that may appear to those skilled in the art and fall within the scope of the following claims.

I claim:

1. In combination with an airplane wing, a landing flap, a first curved track mounted in said wing, a landing flap supporting carriage movably mounted in said first curved track and connected to said landing flap for supporting said landing flap on said wing for bodily movement between a nested position where it is flush with the undersurface of said wing and an extended position where it projects downwardly and rearwardly from the surface of said wing, a landing spoiler flap, hinge means supporting said spoiler flap on said wing for movement between a retracted position where it is substantially flush with the upper surface of said wing and is in overlying relation to said landing flap when the latter is in nested position and an active position where it projects upwardly from the upper surface of said wing, means for moving said landing flap between its nested and extended positions, and separate means for moving said spoiler flap between its retracted position and active position irrespective of the positions of said landing flap including a second curved track in said wing in juxtaposition with said first track and curved in the same direction as said first track, a spoiler flap carriage movable on said second track, link means connecting said spoiler flap with said spoiler flap carriage, and means for moving said spoiler flap carriage on said track.

2. In combination with an airplane wing as in claim 1, and wherein said landing flap moving means comprises a threaded screw and nut, and wherein said spoiler flap carriage moving means comprises a cylinder and piston.

3. In combination with an airplane wing as in claim 1, and wherein said first track is positioned below said second track and is at least twice the length of said second track.

4. In combination with an airplane wing as in claim 1 and wherein said landing flap moving means comprises a threaded screw and nut, and wherein said spoiler flap carriage moving means comprises a cylinder and piston, and wherein said first track is positioned below said second track and is at least twice the length of said second track.

References Cited in the file of this patent

UNITED STATES PATENTS

| | | |
|---|---|---|
| 2,018,546 | Clark | Oct. 22, 1935 |
| 2,117,607 | Griswold | May 17, 1938 |
| 2,130,958 | Kramer | Sept. 20, 1938 |
| 2,194,796 | Joyce | Mar. 26, 1940 |
| 2,263,992 | Joyce | Nov. 25, 1941 |
| 2,344,945 | Knox et al. | Mar. 28, 1944 |
| 2,352,062 | Zap | June 20, 1944 |
| 2,405,726 | Zap | Aug. 13, 1946 |
| 2,445,833 | Kraemer et al. | July 27, 1948 |
| 2,480,040 | Mitchell | Aug. 23, 1949 |
| 2,635,837 | Grant | Apr. 21, 1953 |

FOREIGN PATENTS

| | | |
|---|---|---|
| 529,892 | Great Britain | Nov. 29, 1940 |